United States Patent [19]

Richardson, Jr. et al.

[11] Patent Number: 5,335,266
[45] Date of Patent: Aug. 2, 1994

[54] AUTOMATED TELECOMMUNICATION PERIPHERAL SYSTEM

[75] Inventors: Charles T. Richardson, Jr., Norcross; Kevin L. Austin, Roswell; Samuel F. Billingsley, III, Atlanta, all of Ga.

[73] Assignee: United States Advance Network, Inc., Norcross, Ga.

[21] Appl. No.: 861,625

[22] Filed: Apr. 1, 1992

Related U.S. Application Data

[63] Continuation-in-part of Ser. No. 852,491, Mar. 16, 1992, Pat. No. 5,317,627, which is a continuation of Ser. No. 591,047, Oct. 19, 1990, Pat. No. 5,113,430.

[51] Int. Cl.$^5$ .................... H04M 1/64; H04M 3/42
[52] U.S. Cl. ......................... 379/88; 379/67; 379/89; 379/34; 379/112; 379/202; 379/203; 379/208
[58] Field of Search ............. 379/67, 88, 89, 34, 379/35, 85, 86, 201, 202, 203, 204, 208, 218, 112

[56] References Cited

U.S. PATENT DOCUMENTS

| | | | |
|---|---|---|---|
| 3,728,486 | 4/1973 | Kraus | 179/2 R |
| 4,071,698 | 1/1978 | Barger, Jr. et al. | 179/2 R |
| 4,188,507 | 2/1980 | Meri et al. | 179/60 |
| 4,229,624 | 10/1980 | Haben et al. | 179/18 |
| 4,255,619 | 3/1981 | Saito | 379/96 |
| 4,317,007 | 2/1982 | Harrison | 379/34 |
| 4,320,256 | 3/1982 | Freeman | 379/73 |
| 4,371,752 | 2/1983 | Mathews et al. | 179/7.1 |
| 4,489,438 | 12/1984 | Hughes | 381/51 |
| 4,577,062 | 3/1986 | Hillcary et al. | 379/88 |
| 4,598,367 | 7/1986 | DeFrancesco et al. | 364/408 |
| 4,611,094 | 9/1986 | Asmuth et al. | 379/201 |
| 4,649,563 | 3/1987 | Riskin | 379/97 |
| 4,663,777 | 5/1987 | Szeto | 379/88 |
| 4,716,583 | 12/1987 | Grouer et al. | 379/88 |
| 4,757,267 | 7/1988 | Riskin | 379/201 |
| 4,766,604 | 8/1988 | Axberg | 379/67 |
| 4,792,968 | 12/1988 | Katz | 379/92 |
| 4,797,910 | 1/1989 | Dandelin | 379/244 |
| 4,811,382 | 3/1989 | Sleevi | 379/67 |
| 4,817,130 | 3/1989 | Frimmel, Jr. | 379/88 |
| 4,827,500 | 5/1989 | Binkard et al. | 379/88 |
| 4,829,514 | 5/1989 | Frimmel, Jr. et al. | 370/58 |
| 4,845,739 | 7/1989 | Katz | 379/92 |
| 4,899,375 | 2/1990 | Bauer et al. | 379/264 |
| 4,901,341 | 2/1990 | Carter et al. | 379/67 |
| 4,908,850 | 3/1990 | Masson et al. | 379/88 |
| 4,922,519 | 5/1990 | Davdelin | 379/67 |
| 4,922,520 | 5/1990 | Bernard et al. | 379/88 |
| 4,930,150 | 5/1990 | Katz | 379/93 |
| 4,933,966 | 6/1990 | Hird et al. | 379/132 |
| 4,933,967 | 6/1990 | Lo et al. | 379/207 |
| 4,935,956 | 6/1990 | Hellwarth et al. | 379/112 |
| 4,947,422 | 8/1990 | Smith et al. | 379/200 |
| 4,954,958 | 9/1990 | Savage et al. | 379/207 |
| 5,003,534 | 3/1991 | Gerhardt et al. | 379/94.1 |
| 5,014,303 | 5/1991 | Velius | 379/201 |
| 5,023,868 | 6/1991 | Davidson et al. | 370/62 |
| 5,048,075 | 9/1991 | Katz | 379/92 |
| 5,163,083 | 11/1992 | Dowden et al. | 379/223 |
| 5,185,781 | 2/1993 | Dowden et al. | 379/212 |
| 5,255,309 | 10/1993 | Katz | 379/88 |

OTHER PUBLICATIONS

"System 20", Value Added Communications Brochure, Publication date, unknown.

(List continued on next page.)

Primary Examiner—Thomas W. Brown
Assistant Examiner—Fan Tsang
Attorney, Agent, or Firm—Louis T. Isasf

[57] ABSTRACT

Method and apparatus for providing customized telecommunication services through a peripheral node which includes a node interface for connection through incoming and outgoing telephone trunks to a carrier switch of a public switched network, an audio response unit for recording, playing, and analyzing audio signals, and a node controller for controlling operation of the node interface and the audio response unit.

7 Claims, 8 Drawing Sheets

OTHER PUBLICATIONS

"Conquest III Inmate Telephone System", Tele-Matic Corporation Brochure, Publication date, unknown.

Customer Control of Network Services, G. A. Raack, E. G. Salble, R. J. Stewart, Oct. 1984, vol. 22, No. 10, IEEE Comm. Mag. pp. 8-14.

AT&T's Conversant I Voice System–John P. Moosemiller, Mar/Apr. 1986 Speech Technology, pp. 88-93.

Conversant I Voice System: Architecture and Applications, Robert J. Perdue, Eugene L. Rissanen, AT&T Technical Journal pp. 34-47.

David S. Cheeseman, Martin B. Cooper, Radion and Electronic Engineer, vol. 53 (1983) Voice Signalling In the Telephone Network, pp. 241-247.

Second IEE National Conference on Telecommunications, P. P. Cretch, A. R. Allwood, E. S. P. Allard, A Network for Recorded Information Distribution, Apr. 1989, pp. 10-14.

David R. Fischell, Sarbmeet S. Kanwal, Daniel Furman, Interactive Voice Technology Applications-AT&T Technical Journal Sep./Oct. 1990, pp. 61-76.

AUTOMATED TELECOMMUNICATION PERIPHERAL SYSTEM

CROSS-REFERENCE TO RELATED APPLICATIONS

This application is a continuation-in-part of application Ser. No. 07/852,491, filed Mar. 16, 1992, now U.S. Pat. No. 5,317,627, which is a continuation of Ser. No. 07/591,047, filed Oct. 1, 1990, now U.S. Pat. No. 5,113,430, allowed Jan. 28, 1992.

BACKGROUND OF THE INVENTION

The present invention relates generally to the field of telecommunications, and more specifically, to the field of automated peripheral systems providing telecommunication services.

The field of telecommunication services is very large. One area of telecommunication services assists calling parties in transferring information from the calling parties to destination parties, thus assisting parties in "giving" information. This first area of telecommunication services includes, without limitation, such services as voice mail, voice messaging, operator-assisted call-bridging, registration/reservation services, and catalog ordering services.

A second area of telecommunication services assists callers in retrieving information from remote sources, thus assisting parties in "receiving" information. This second area of telecommunication services includes, without limitation, such services as directory assistance, news services, stock market services, and credit validation services.

In the past, automated telecommunication systems have typically offered only one, or a selected few, of the above-mentioned services. There is, therefore, a need in the industry for an automated telecommunication system capable of providing a large variety of services.

SUMMARY OF THE INVENTION

Briefly described, the present invention includes, in its most preferred embodiment, a method and an apparatus for providing customized, telecommunication services. The apparatus of the preferred embodiment of the present invention is connected as a peripheral system through incoming and outgoing telephone trunks to a carrier switch of a public switched network and includes at least one peripheral node which includes a node interface for interfacing to the carrier switch, an audio response unit for recording, playing, and analyzing audio signals, and a node controller for controlling operation of the node interface and the audio response unit. The public switched network is configured to direct calls from a selected plurality of customer telephones to a first set of input ports on the node interface.

The method of the preferred embodiment of the present invention includes, with respect to an example call-bridging application, receiving an origination number and a destination number after a caller originates a long distance call from a customer telephone. The peripheral node then generates input port identification data identifying the peripheral node input port receiving the call. The peripheral node then analyzes the input port identification data, the destination number, and the origination number to select, initiate, and configure a customized call-bridging application. Such call-bridging applications may be used in a variety of environments including various types of corporations, hotels, government institutions, and private homes.

An alternate embodiment of the present invention includes a plurality of peripheral nodes distributed over a wide area, and the public switched network is configured to direct calls to an alternate peripheral node upon unavailability of a primary peripheral node. In another alternate embodiment of the present invention, a central controller is connected to the plurality of peripheral nodes and provides diagnostic and node configuration alteration functions. In yet another alternate embodiment of the present invention, one central controller is used to replace all of the node controllers so that the central controller actively controls each and every peripheral node.

It is therefore an object of the present invention to provide an automated telecommunication peripheral system which provides customized telecommunication services.

Another object of the present invention is to provide an automated telecommunication peripheral system which is connected, through both inbound and outbound telephone lines, to one carrier switch of a public switched network.

Still another object of the present invention is to provide a call-bridging system which analyzes input port identification data, origination numbers, and destination numbers to select customized telecommunication applications.

Still another object of the present invention is to provide an automated method of bridging calls.

Still another object of the present invention is to provide a telecommunication peripheral system which retrieves and provides to callers information from remote information providers.

Still another object of the present invention is to provide a telecommunication peripheral system which includes a plurality of peripheral nodes connected through a public switched network which directs calls to secondary nodes upon unavailability of primary nodes.

Still another object of the present invention is to provide a telecommunication peripheral system which provides voice messaging functions to voice messaging callers and to call-bridging callers when call-bridging is unsuccessful.

Other objects, features and advantages of the present invention will become apparent upon reading and understanding this specification, taken in conjunction with the accompanying drawings.

DETAILED DESCRIPTION OF THE PREFERRED EMBODIMENT

Figure 1:
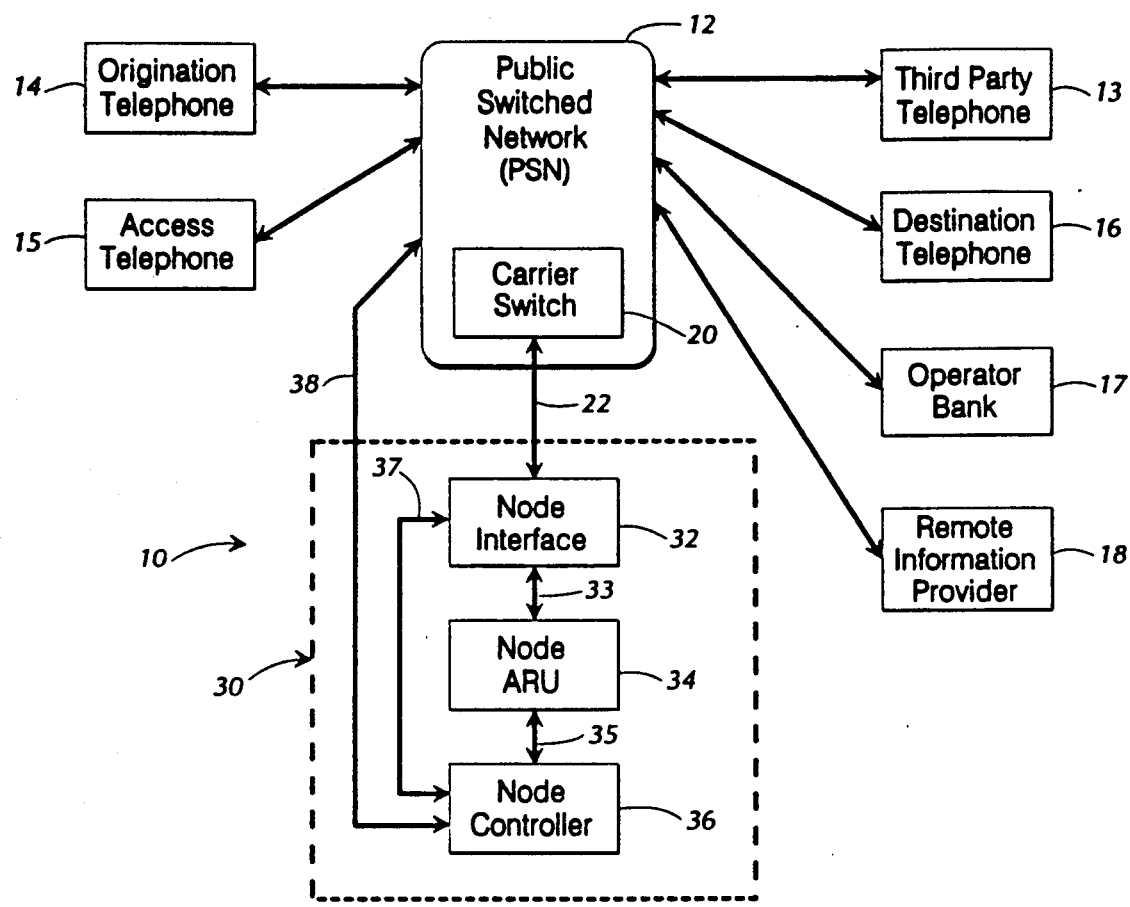
FIG. 1 is a block diagram representation of the physical domain of an Automated Telecommunication Peripheral System and associated components, in accordance with the preferred embodiment of the present invention.

Referring now in greater detail to the drawings, in which like numerals represent like components throughout the several views, FIG. 1 shows a block diagram representation of the physical domain of an Automated Telecommunication Peripheral System 10 and associated components, in accordance with the preferred embodiment of the present invention. The system 10 includes a peripheral node 30 which includes a node interface 32, a node audio response unit (ARU) 34, and a node controller 36. The node interface 32 is connected through a network trunk group 22 to a carrier switch 20 of a public switched network (PSN) 12. The node ARU 34 is connected to the node interface 32 through an ARU trunk group 33 and to the node controller 36 through an ARU control line 35. The node controller 36 is connected to the node interface 32 through an interface control line 37 and to the PSN 12 through a controller access line 38.

An origination telephone 14, an access telephone 15, a destination telephone 16, a third party telephone 13, an operator bank 17, and a remote information provider 18 are also shown connected to the PSN 12. Although represented as a single box, the origination telephone 14 represents a plurality of customer telephones serving one or more customers at one or more locations. Likewise, the access telephone 15, third party telephone 13, and destination telephone 16 represent pluralities of telephones. Furthermore, the remote information provider 18 represents a plurality remote systems providing a variety of services. Operation of the elements 14–18 will be discussed in greater detail below.

It should also be understood that the PSN 12 includes a great variety of interconnecting switches, including local exchange carrier central offices (LEC CO's), access tandems, and long distance carrier points of presence (LDC POP's). Examples of acceptable connection links between the origination telephone 14 and the peripheral node 30 include equal access lines traveling through LEC CO's, direct access lines, and 800-number lines accessed through automatic dialers.

The trunk groups 22, 33 each represent a plurality of incoming and outgoing trunks having pluralities of communication paths. One example of an acceptable trunk is the common T1 line. The ARU control line 35 and the interface control line 37 are data lines. One example of an acceptable data line for the ARU control line 35 and the interface control line 37 is the common RS-232 line. The controller access line 38 represents at least one ordinary telecommunication line which provides the node controller 36 access to the PSN 12 without going through the node interface 32. Furthermore, although only one node interface 32 and node ARU 34 are shown included in the peripheral node 30, it is understood that additional components are added to increase capacity of the peripheral node 30.

Figure 2:
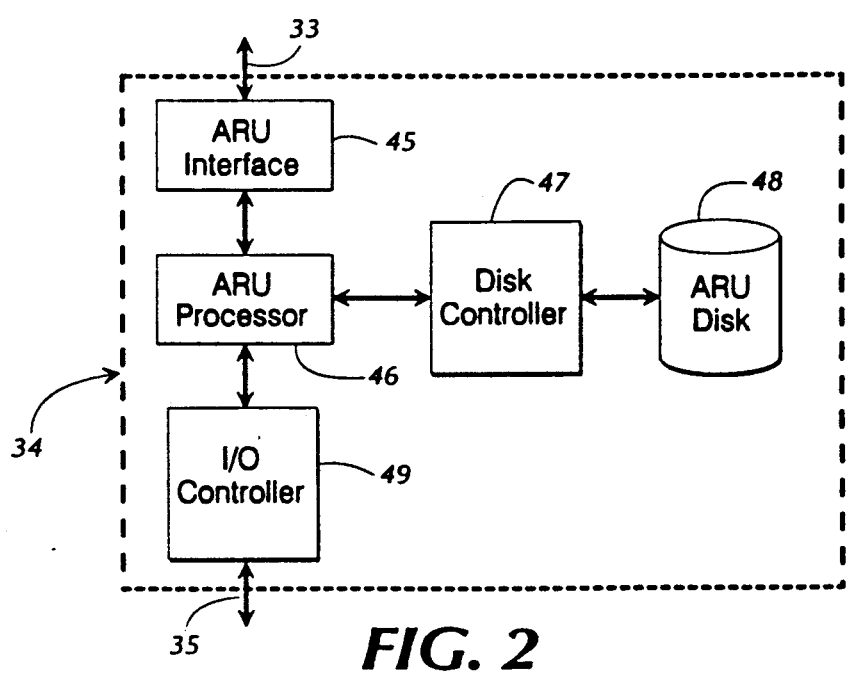
FIG. 2 is a block diagram representation of the node ARU of FIG. 1.

Refer also to FIG. 2, which shows the node ARU 34 of the preferred embodiment of the present invention in greater detail. References to components not appearing in particular Figures being described and not otherwise noted are understood to refer to FIG. 1. The node ARU 34 includes an ARU interface 45, an ARU processor 46, a disk controller 47, an ARU disk 48, and an I/O controller 49, connected as shown. The ARU 34 is an audio peripheral which, under the direction of the node controller 36, records, plays, and analyzes audio signals, as is explained in greater detail below. The ARU processor 46 controls the ARU interface 45, disk controller 47, and ARU disk 48 in response to commands received through the I/O controller 49 and ARU control line 35 from the node controller 36. The ARU interface 45 is capable of detecting and producing dual tone multi-frequency (DTMF) signals and converting audio signals between T1 and ARU disk 48 formats. One example of an acceptable node ARU 34 is the BTIII from Perception Technology Corp. of Canton, Mass.

Figure 3:
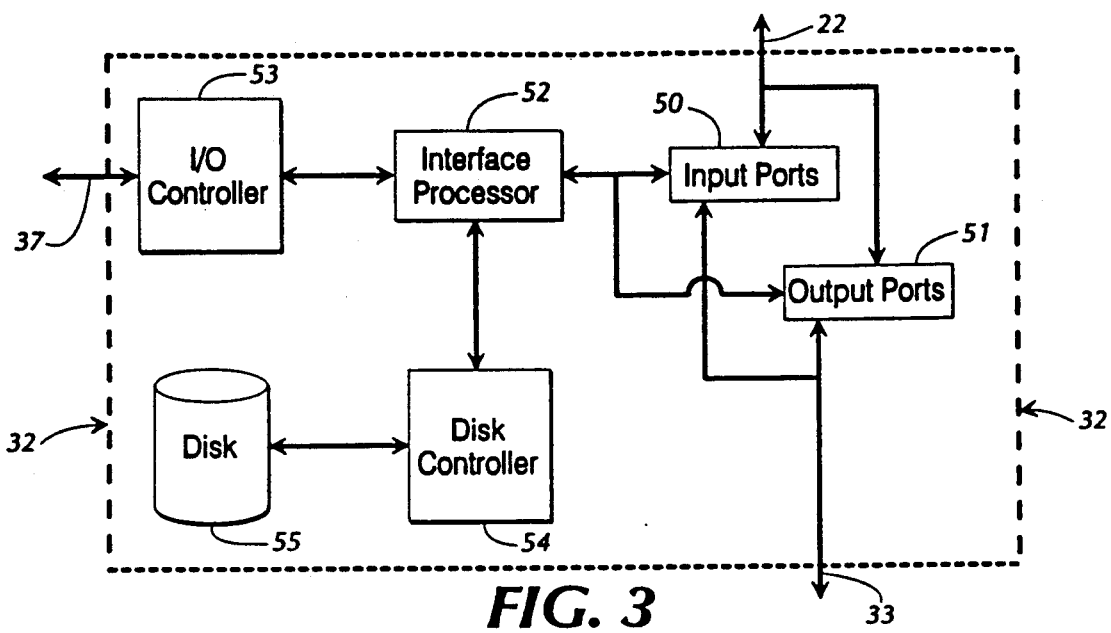
FIG. 3 is a block diagram representation of the node interface of FIG. 1.

FIG. 3 shows a block diagram representation of the node interface 32 of FIG. 1. The node interface 32 is shown including input ports 50, output ports 51, an interface processor 52, an I/O controller 53, a disk controller 54, and a disk 55, connected as shown. Regardless of the particular connection link between the origination telephone 14 and the node interface 32, the PSN 12 is configured to direct calls from the origination telephone 14, through the PSN 12 and network trunk group 22, and to specific input ports 50 on the node interface 32. Operation of the node interface 32 is controlled by both the interface processor 52 and the node controller 36, which sends commands through the interface control line 37 and the I/O controller 53. One example of an acceptable node interface 32 is the SDS-1000 from Summa Four of Manchester, N.H.

Figure 4:
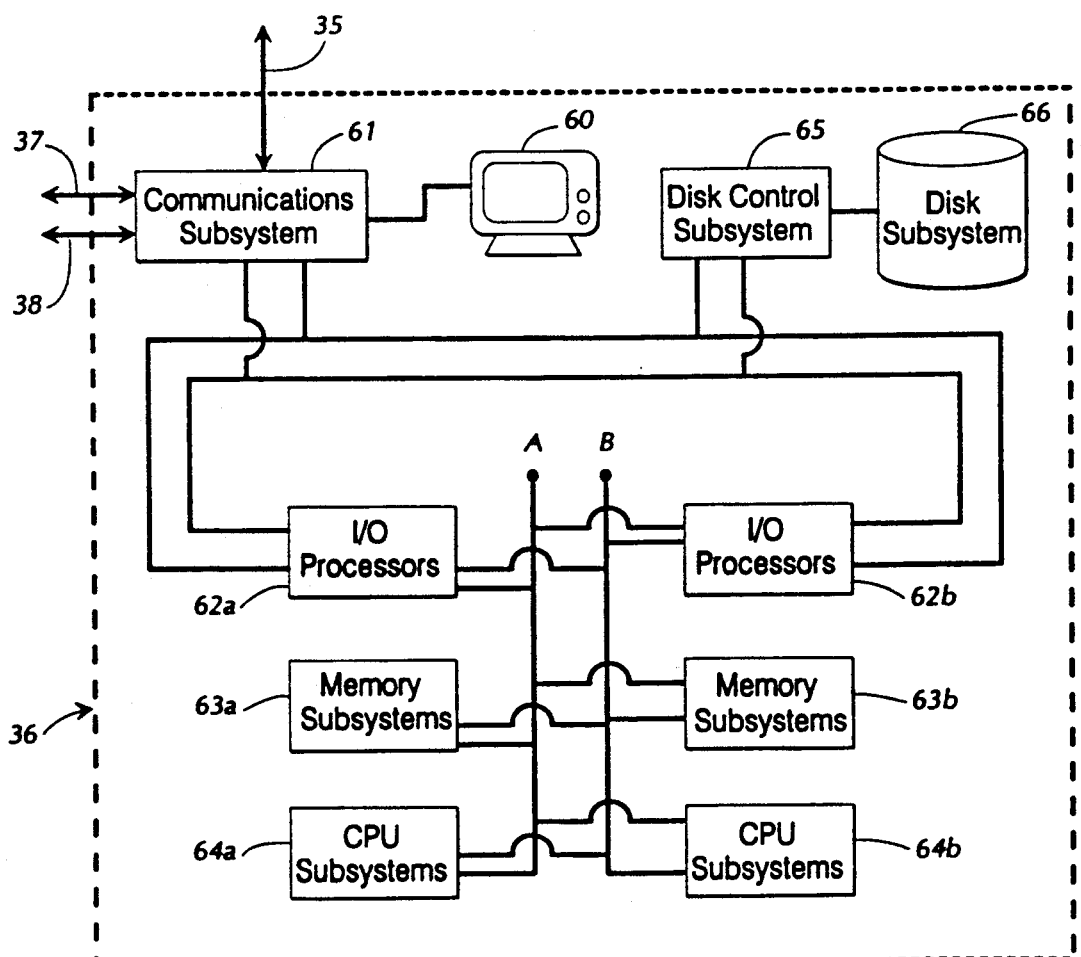
FIG. 4 is a block diagram representation of the node controller of FIG. 1.

Refer now to FIG. 4, which shows a block diagram representation of the node controller 36 of FIG. 1. Node controller 36 is a fault tolerant, general purpose controller which offers utility grade service from a redundant architecture which is capable of processing many applications simultaneously. Two buses, A & B, are both connected to redundant hardware components, including I/O processors 62a & 62b, memory subsystems 63a & 63b, and CPU subsystems 64a & 64b. I/O processors 62a & 62b are both connected to communications subsystem 61 and disk subsystem 66 through disk control subsystem 65. The ARU control line 35, interface control line 37, and control access line 38 are shown connected to communications subsystem 61. Terminal 60 is also shown connected to communications subsystem 61.

The redundant architecture of the node controller 36 ensures continuous application reliability and availability. If one component fails, its partner component typically continues so that there are normally two components performing the same function at the same time. Also, each CPU subsystem 64a, 64b contains duplicate CPU's which process the same data at the same time, thus a total of four processors typically work on the same data at the same time. Logic comparators continually compare the results of each processor. If the processors on a board disagree, that particular board is taken off line, an error signal is generated, and its partner component continues without any processing degradation.

The operation of each component of the node controller 36 is relatively straight forward. CPU subsystems 64 provide processor functions; memory subsystems 63 provide operating memory; and I/O processors 62 provide input and output capabilities. Disk control subsystem 65 provides control of disk subsystem 64, which stores conventional operating system programming and application programming. Terminal 60 provides human access to node controller 36 through communications subsystem 61. One example of an acceptable node controller 36 is the Stratus XA2000 model 30 from Stratus Computer, Inc. of Marlboro, Mass.

Figure 5:
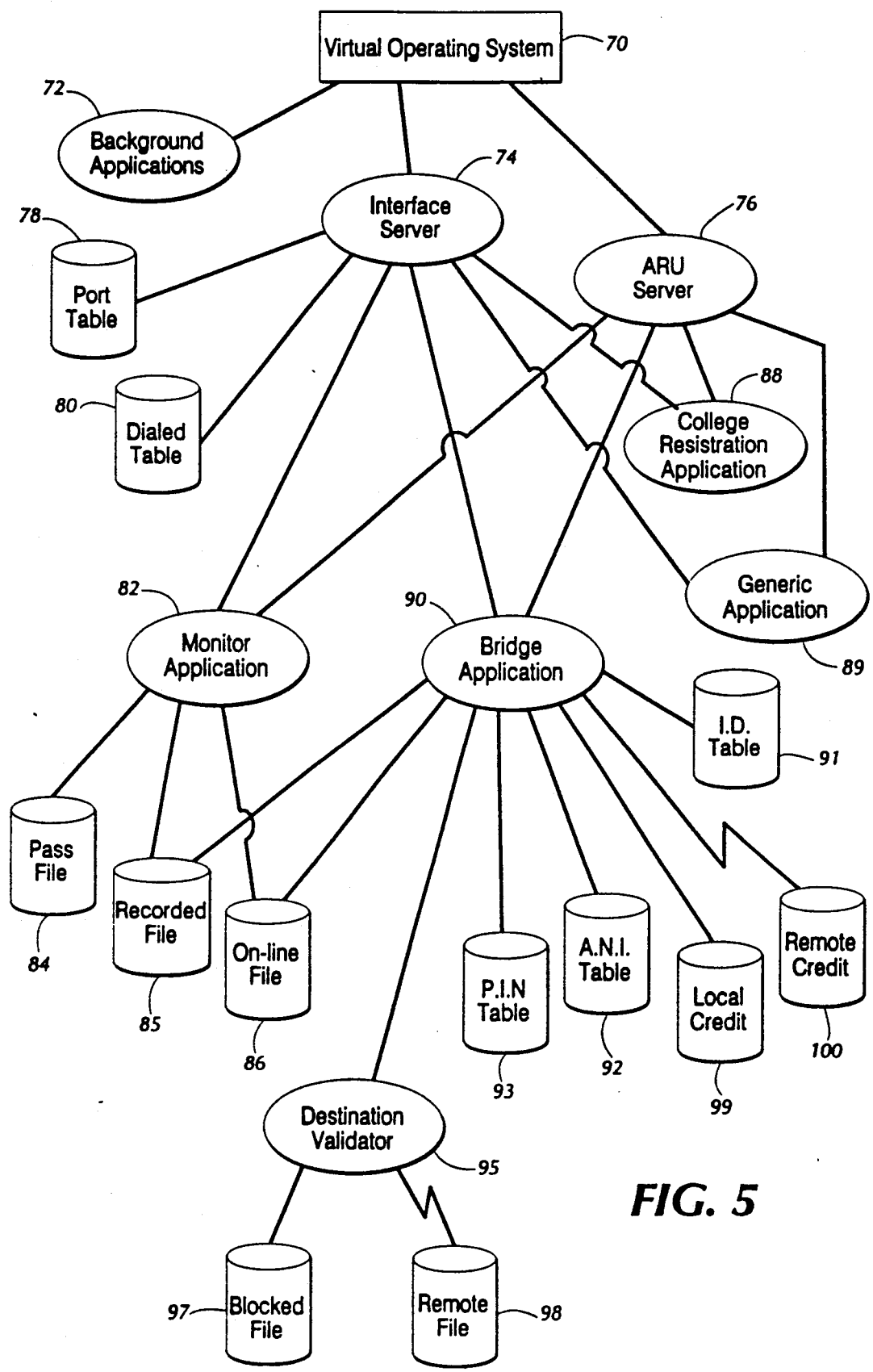
FIG. 5 is a block diagram representation of the program domain of the system of FIG. 1.

FIG. 5 is a block diagram representation of the program domain of the automated telecommunication peripheral system 10 of the preferred embodiment of the present invention. In the preferred embodiment of the present invention, the programming domain represents programming found, in large part, on the node controller 36. Running below virtual operating system 70 are background applications 72, interface server 74 and ARU server 72. The interface server 74 accesses an input port table 78 and a dialed number table 80. Both the interface server 74 and the ARU server 76 are connected to a monitor application 82, college registration application 88, generic application 89, and a bridge application 90. The connecting lines extending between the servers 74, 76 and applications 82, 88, 89, 90 represent interprocess communication paths. Although represented as single applications, the applications 82, 88, 89, 90 represent pluralities of customized applications running simultaneously on the node controller 36.

The monitor application 82 is shown having access to a password file 84, a recorded file 85, and an on-line file 86. The bridge application 90 is also shown having access to the recorded file 85 and the on-line file 86. In addition, the bridge application 90 has access to an identification (ID) table 91, an automatic number identification (ANI) table 92, a personal identification number (PIN) table 93, a local credit file 99, a remote credit file 100 located on a remote information provider 18, and a destination validator 95, which is shown having access to a blocked file 97 and a remote file 98, located on the remote information provider 18 (FIG. 1).

Background applications 72 include applications which provide services which include, without limitation: billing, testing, error detection, and error notification. Billing services accumulate and format transaction records of each caller into appropriate billing formats for use locally or by remote billing agencies, accessed through the controller access line 38 (FIG. 1). Testing services routinely test various components throughout the system, including each communication path connected to the peripheral node 30. The error detection and error notification services evaluate error signals received from various components and the testing services to identify the various types of errors. Based on that information, appropriate service personnel are notified of the error. Notification steps may include directing the node ARU 34 and node interface 32 to call and announce to selected service personnel appropriate error messages or accessing radio paging systems to notify the service personnel.

The interface server 74 and ARU server 76 are multitasking, multi-threading processes which provide programming interfaces between applications and the node interface 32 and node ARU 34, respectively. The node controller 36 utilizes servers and applications which reference files and tables during processing. Such a table-referencing method enhances customization, facilitates programming changes, and increases system availability.

Figure 6:
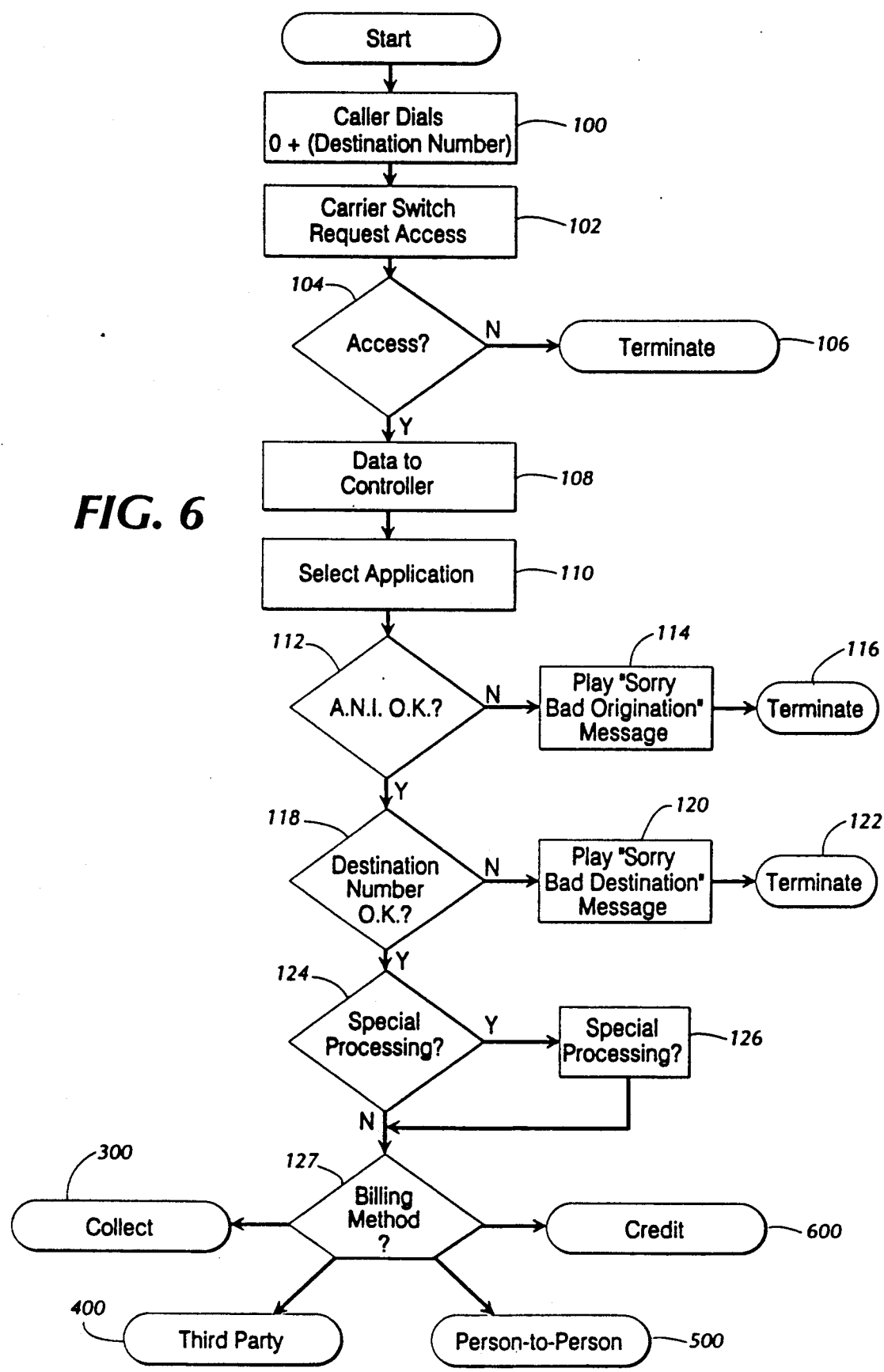
FIGS. 6–12 are flow chart representations of steps taken by the system of FIG. 1 when executing a call-bridging process.

FIGS. 6-12 are flow chart representations of steps taken by the preferred embodiment of the present invention when executing a call-bridging process. Refer to previous Figures when references are made to components previously discussed. In FIG. 6, the collect-call bridging process is shown beginning in step 100 when a caller uses a selected customer telephone 14 to dial 0+(destination number). The directory number assigned to the destination telephone 16 (and dialed by the caller) is referred to herein as the destination number, and the directory number assigned to the calling telephone (origination telephone 14) is referred to herein as the origination number.

As configured, the PSN 12 routes the call to the carrier switch 20. The carrier switch 20 then requests access to the peripheral node 30 (step 102) by signalling over the network trunk group 22 in a predefined format which is specific to a particular communication path leading into a particular input port 50. Several acceptable protocols include Feature Group D, direct access lines (or equivalent), and 800-number access through a dialer. The Feature Group D and dialer methods include supplying both the origination number and destination number, whereas the direct access method only supplies the destination number since the input port designation functions as an equivalent to the origination number for any direct access lines. A carrier may also provide Dialed Number Identification Service (DNIS), which provides digits corresponding, and functioning as an equivalent, to a particular destination number dialed by the caller.

After the node interface 32 receives the request for access from the carrier switch 20, the node interface 32 analyzes the data of the request to determine if access should be granted (decision 104). In the preferred embodiment of the present invention, the interface processor 52 of the node interface 32 compares the data to configuration tables saved on the disk 55 to determine if access is granted. If access is not granted, the process is terminated (step 106), as is discussed in greater detail below. If access is granted, the call is answered and data is transferred from the node interface 32 to the node controller 36 along the interface control line 37 (step 108). The transferred data corresponds to the origination number, the destination number (or equivalent), and input port identification data generated by the node interface 32.

As the node controller 36 receives the transferred data, the program domain shown in FIG. 5 is accessed. The interface server 74 receives the transferred data and compares the interface identification data to the input port table 78 to select and initiate a customized application (step 110). If an input port 50 has been assigned to a particular application, such as a bridge application 90, the transferred data is then passed to the customized application through interprocess communication. However, if an input port 50 receives calls for many different applications, such as the monitor application 82, college registration application 88, or generic application 89, the interface server 74 also references the dialed number table 80 to select a particular application and pass thereto the transferred data. A collect-call bridge application 90 is selected and initiated at step 110.

The first steps of the bridge application 90 are to analyze the origination number and destination number to further configure the bridge application 90 since, in addition to utilizing a plurality of customized bridge applications 90 in the preferred embodiment of the present invention, one particular bridge application 90 is often used to service a variety of different customers, thus further configuring (or customizing) is necessary. According to the bridge application 90, the origination number (also referred to as the ANI) is first checked (step 112) against the ANI table 92 to verify that the PSN 12 and carrier switch 20 only direct calls from selected customer origination telephones 14. If the origination number is invalid, the peripheral node 30 plays an announcement to the caller which indicates that the caller's telephone cannot access the peripheral node 30. More specifically, the node controller 36, under direction of the bridge application 90, interface server 74, and ARU server 76, directs the node ARU 34 to play a particular digitized message on one of the communication paths on the ARU trunk group 33 and directs the node interface 32 to bridge that communication path with the communication path leading through the network trunk group 22 to the origination telephone 14 so that the caller hears the announcement. The process is then terminated at step 116.

If the ANI is valid, the destination number is checked (step 118) through the destination validator 95, which selectively accesses the blocked file 97 stored locally on the disk subsystem 66 (FIG. 4) and the remote file 98 stored remotely on the remote information provider 18 (FIG. 1). The destination number is checked to verify that the owner of the destination number has not precluded calls from particular origination telephones 14 (blocked file 97) or requests for acceptance of collect-call charges (remote file 98). If the destination number is not valid, an announcement is played to the caller indicating why the call cannot be completed, and the process is terminated (steps 120, 122).

If the destination number is valid, the bridge application 90 refers to the ID table 91 to determine, also based on the origination number, if special processing is required for this particular call, based on specific installation options (steps 124, 126). One optional special process includes prompting a caller to transmit DTMF digits representing a personal identification number (PIN) and checking the caller's response against the PIN table 93. Such a process can be used to further limit access to the peripheral node 30. Another optional special processing routine includes giving a caller an opportunity to choose, or example, Spanish prompts. Yet another routine includes recording, or allowing real-time monitoring, of a caller's conversation, as is discussed in greater detail below. In addition to performing special processing at the time indicated by step 126, special processing also refers to setting variables for optional processes which are delayed until later stages of the bridge application 90.

Step 127 refers to prompting the caller to choose, with a DTMF response, a billing method for the call. More specifically, the node controller 36 instructs the node interface 32 to connect an ARU trunk group 33 communication path to the caller's communication path on the network trunk group 22 and instructs the node ARU 34 to play a prompt requesting the caller to press a key corresponding to one of a several optional billing methods. The node ARU 34 is further instructed to analyze the response and relay the signal back to the node controller 36. If no response is received, the caller is prompted again and subsequently dropped by the peripheral node if the caller remains silent.

Figure 7:
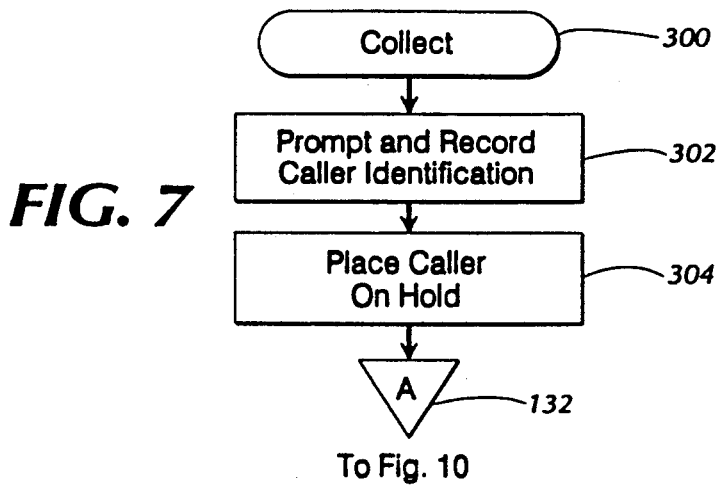

If the collect-call billing method is selected by the caller, the collect subroutine 300, shown in FIG. 7, is executed. The caller is prompted for identification information (the caller's name), which is digitized and stored on the node ARU 34 (step 302). The caller is then placed on hold, and music is supplied to the caller's communication path by the node interface 32. If the person-to-person billing method is selected by the caller, the person-to-person subroutine 500 is executed. The person-to-person subroutine 500 is very similar to the collect subroutine 300 in that the caller is prompted for identification and placed on hold. However, with the person-to-person subroutine, the caller is also prompted for identification of the destination party. With both options, the process continues in FIG. 10 at step 132.

Figure 8:
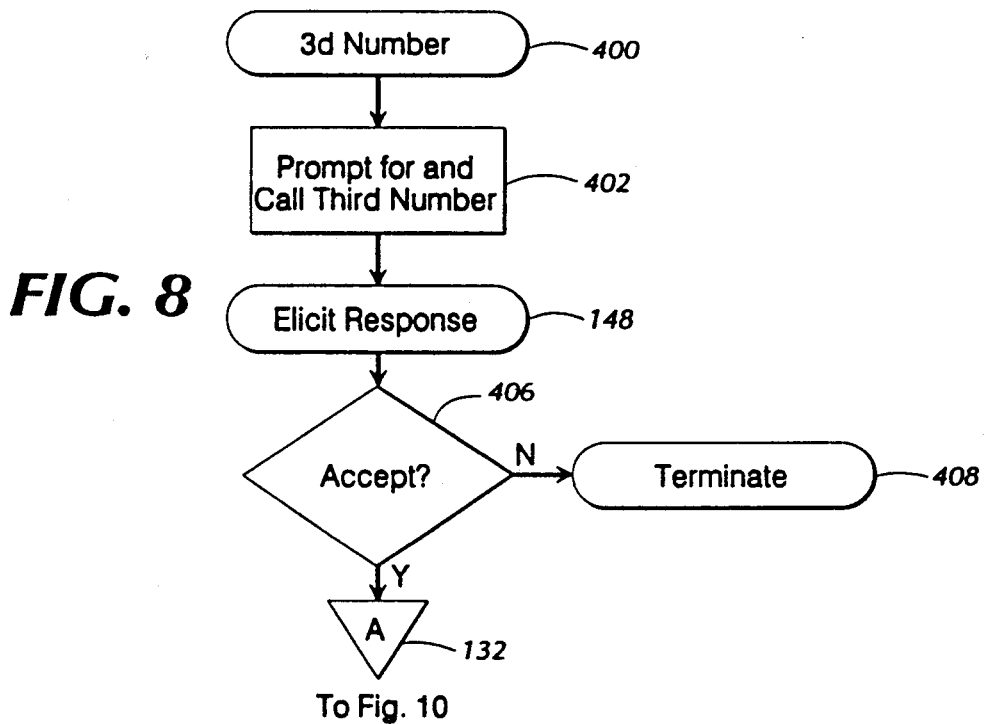

Referring back to FIG. 6, if the third party billing method is selected by the caller, the third party subroutine 400, shown in FIG. 8, is executed. Step 402 indicates that the caller is prompted for a DTMF representation of the third party number to which the call is to be billed, and the third party number is dialed. Specifically, the node controller 36 instructs the node ARU 34 to, after prompting the caller for, and subsequently recording, the third party number, transmit the third party number through an output port of the node interface 32 and the network trunk group 22 to the carrier switch 20.

Although protocal-specific data may accompany the third party number, the peripheral node 30 does not transmit destination-specific routing instructions to the carrier switch 20 since the peripheral node 30 is part of a peripheral system and; therefore, does not utilize destination-specific routing tables or files. The carrier switch 20, rather than the peripheral node 30, then attempts to route the call to the third party telephone 13. Even in an alternate embodiment where multiple carrier switches 20 are connected to a peripheral node 30, the peripheral node 30 does not route any outgoing calls based on the outgoing number.

Although not indicated in FIG. 8, the call is terminated if the third party does not answer the third party telephone 13 or if the third party telephone 13 is busy. In another embodiment of the bridge application 90, the process returns, upon this and other terminations throughout the process, to step 127 to give the caller an opportunity to choose another billing option.

Figure 11:
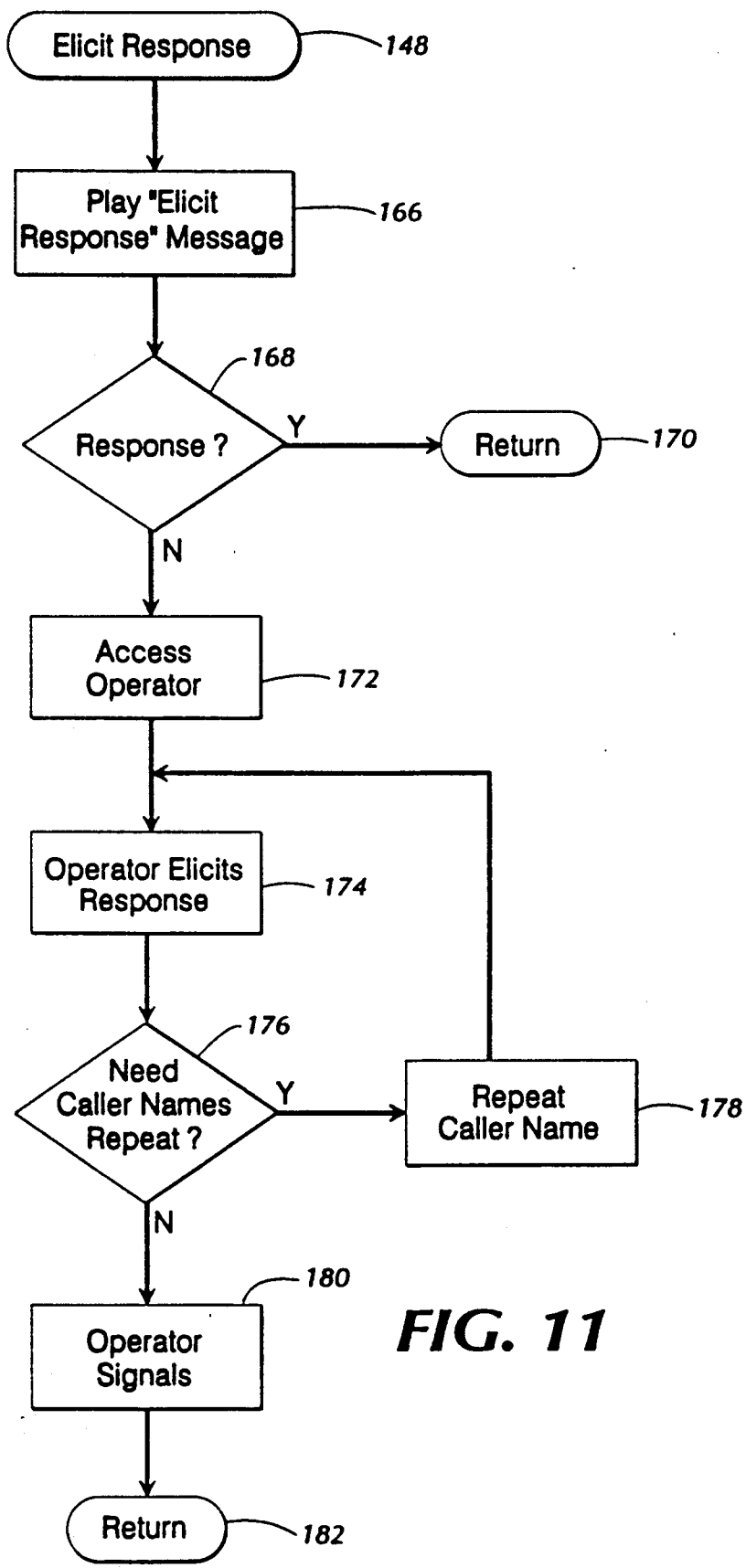

If a third party answers the third party telephone 13, the elicit response subroutine 148 is executed, as shown in FIG. 11. An announcement is first played notifying the third party that the caller is attempting to bill the third party for a call and requesting the third party to indicate, through transmitting a DTMF digit, whether or not the third party will accept the charges (step 166). Such an announcement includes playing the digitized caller's name. If the third party responds to the announcement, the process continues in FIG. 8 (steps 168, 170).

However, if the third party does not respond, the peripheral node 30 initiates another call to the operator bank 17 and bridges a live operator onto the third party's communication path through the node interface 32 (step 172). The operator manually elicits a response (step 174) from the third party. If the third party needs the caller's name repeated, (step 176, 178) the operator can signal the peripheral node 30 to play the digitized caller's name again. After receiving the third party's response regarding acceptance of the charges, the operator signals an indication (step 180) back to the peripheral node 30. The process then continues in FIG. 8.

If the third party chooses not to accept the charges, the call is terminated (steps 406, 408), or in alternate embodiments, the process returns to step 127 to give the caller another billing option. On the other hand, if the third party chooses to accept the charges, the process continue at step 132 in FIG. 10.

Figure 9:
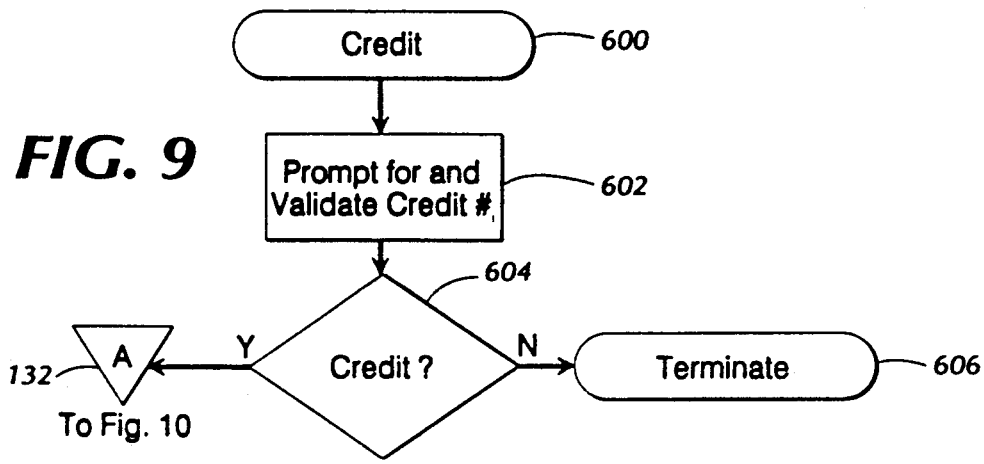
Figure 10:
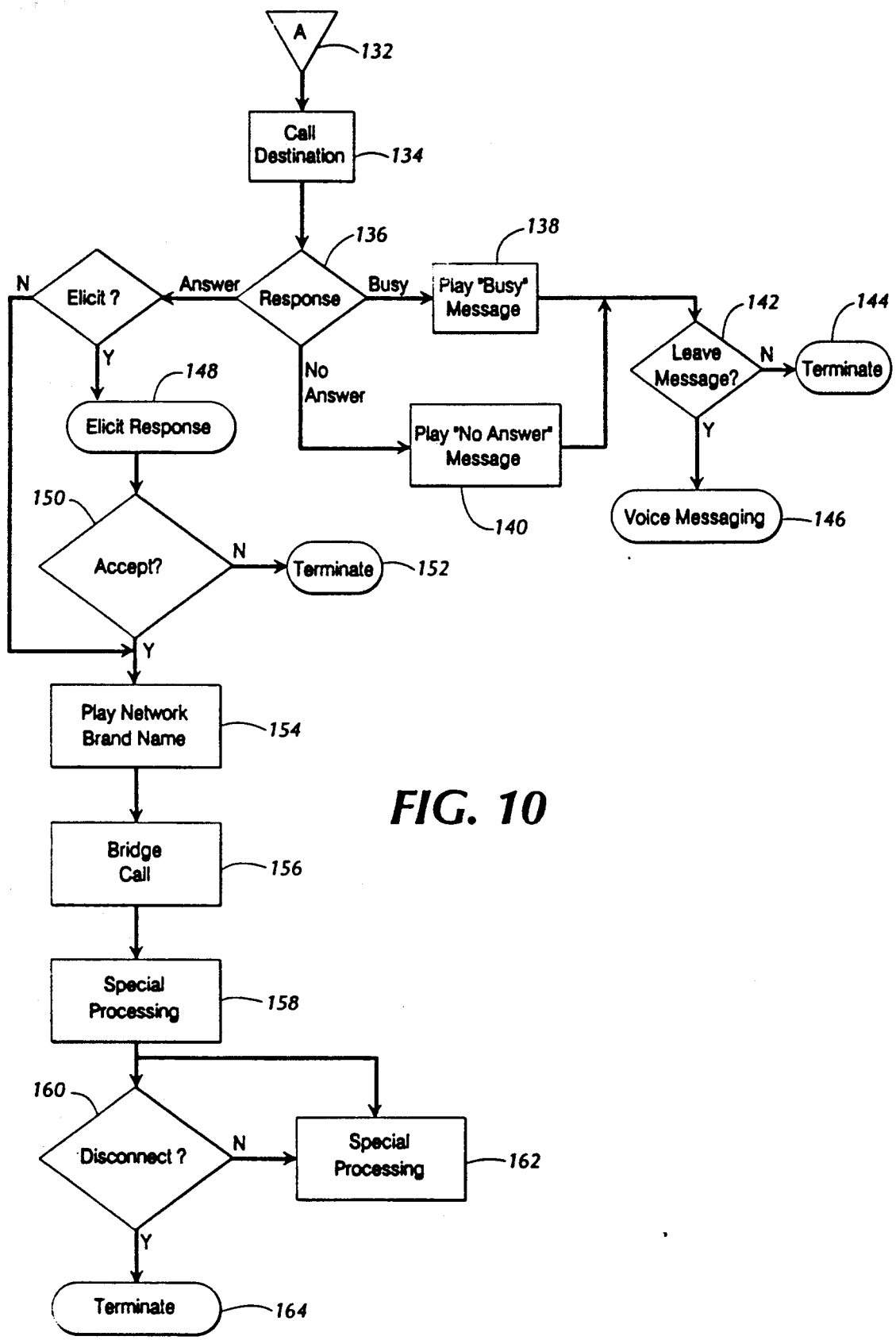

Referring back to FIG. 6, if the caller chooses the credit billing method, such as a credit card or calling card, the credit subroutine 600, shown in FIG. 9, is executed. Step 602 represents prompting the caller for a credit account number and validating the credit number. Such validation includes, optionally, performing local analysis, referring to a local credit file 99, or accessing a remote credit file 100. (FIG. 5). If the credit number cannot be validated, the call is terminated (step 606), or in alternate embodiments, given additional billing options (step 127). If the credit number is validated, the process continues at step 132 in FIG. 10.

Step 134 indicates that the peripheral node 30 calls the destination number to access the destination telephone 16. If there is no answer from the destination telephone 16, or if the destination telephone 16 is busy, (step 136) the bridge application 90 plays an appropriate "no answer" or "busy" message, respectively (steps 138, 140). The caller is then given the option of leaving a message for the destination party (steps 142-146). Voice messaging 146 includes recording a message from the caller and attempting to deliver the message to the destination party at least one later point in time.

If the destination party answers the destination telephone 16, the bridge application 90 elicits a response (step 148) from the destination party if the caller selected a collect or person-to-person billing method. As discussed above, the elicit response subroutine 148 is shown in FIG. 11. If the caller selected a collect call billing option, the elicit response subroutine 148 includes asking the destination party to accept the charges. If the caller selected a person-to-person billing option, the elicit response subroutine 148 includes verifying that the destination party is accurately identified by the stored destination party identification given by the caller. If the destination party does not accept the collect charges, or is not the party to whom the person-to-person call was directed, the call is terminated (steps 150, 152).

If the call is accepted, or if no response was elicited, the bridge application 90 plays a branding message thanking the parties for using the peripheral node 30 (step 154). The call is then bridged through the node interface 32 (step 156). As the call is being bridged, origination-specific special processing variables for monitoring the conversation are checked (step 158). Such steps include accessing the on-line file 86 to determine if any customer administrators (customers having monitoring access) are holding to monitor the conversation, as is discussed in more detail below.

During the conversation, the bridge application 90 continually monitors the conversation to detect a disconnect in order to terminate the bridge (steps 160, 164). Also, additional origination-specific special processing is optionally performed (step 162). Such special processing includes limiting durations of calls or playing overlaying messages to the parties advising them of various types of information, such as the length of the call.

The process of terminating a call involves several steps. First, all communication paths are closed which may still be open on any inbound or outbound ports on the node interface 32 connected to either the network trunk group 22 or the ARU trunk group 33 which have been associated with this particular call. Then, a call detail record including the length of the call is created by the background application 72 and processed. Transmission of the billing records through the controller access line 38 to a billing service optionally occurs immediately after each call or on a batch basis. Finally, optional special processing occurs, such as saving a recorded conversation and updating the recorded file 85.

Figure 12:
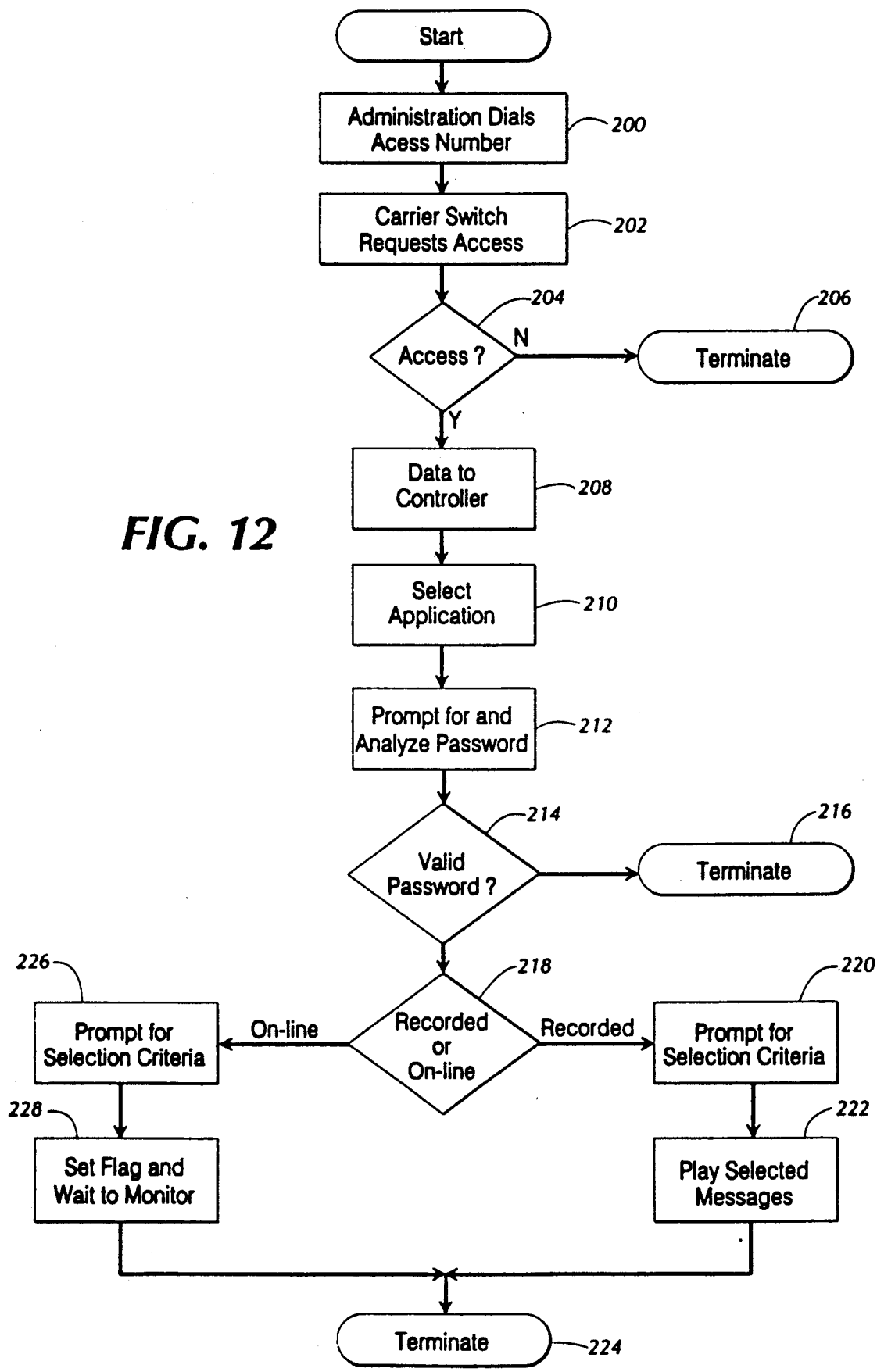

FIG. 12 shows a flow chart representation of the process of accessing the peripheral node 30 to monitor caller conversations, including monitoring previously-recorded conversations and on-line, real-time conversations. In steps very similar to those shown in FIG. 6, the carrier switch 20 requests access to the peripheral node 30 (step 202). If access is granted by the node interface 32, (step 204) the origination number, dialed number (destination number), and input port identification data are transmitted to the node controller 36 (step 208). The interface server 74 then references the input port table 78 and dialed number table 80 to select and initiate a particular monitor application 82 (step 210).

The monitor application 82 then directs the ARU server 76 and interface server 74 to direct the node ARU 34 and node interface 32, respectively, to prompt the customer administrator for a password, record the customer administrator's response, and transmit the response back to the node controller 36 for analysis. The node controller 36 analyzes the password response and compares it to the password file 84 (step 212). If the password is not valid, the process is terminated (steps 214, 216). If the password is valid, the customer administrator is prompted to select on-line or recorded monitoring. (step 218)

If the customer administrator selects on-line monitoring, the customer administrator is prompted for selection criteria to determine which types of conversations are to be monitored (step 226). A customer administrator may choose to monitor all calls from one or more origination telephones 14, to one or more destination telephones 16, by one or more callers with identified by distinct PIN's, or any combination thereof. After the customer administrator selects the criteria, a flag is set in the on-line file 86 which acts as a signal to all currently proceeding and future bridge applications 90 that a customer administrator desires to monitor certain types of conversations (step 228). If a match is ever found, the appropriate bridge application 90 will create a bridge to allow the customer administrator to listen to the conversation.

If the customer administrator selects recorded monitoring, the customer administrator is again prompted for selection criteria (step 220). The monitor application 82 then accesses the recorded file 85 to determine if any recorded conversations match the selection criteria. If matches are found, the monitor application directs the node ARU 34 to play the conversations to the customer administrator (step 222). After monitoring is completed, the application is terminated (step 224).

In the college registration application 88, student callers are allowed to call into the telecommunication peripheral system 10 over 800-type or 900-type number. (900-type numbers are similar to ordinary telephone calls with the exception that they normally cost callers additional money which is paid to the service provider) Student callers would enter registration information in response to audio prompts, and the node controller 36 would interface with another remote information provider 18, which would be a particular college registration computer in this application. Alternately, the registration could be handled completely by the node controller 36 without real-time interfacing with any another computer.

The generic application 89 represents a plurality of other telecommunication peripheral services including banking and credit card information services, check guarantee services, catalog ordering services, stock market information services, and various types of news services. The actual steps taken by these applications depend on the type of information being exchanged.

In alternate embodiments of the present invention, voice recognition components are included in the node ARU 34 to discriminate audio responses in addition to the standard DTMF responses. In such embodiments, the voice recognition component allows applications to accept DTMF or voice responses from callers. One example of an acceptable voice recognition component is available from Perception Technology Corp. of Canton, Mass.

In another alternate embodiment of the present invention, a plurality of peripheral nodes 30 are distributed over a wide area, and the public switched network is configured to direct calls to an alternate peripheral node 30 upon unavailability of a primary peripheral node 30. In another alternate embodiment of the present invention, a central controller, similar to the node controller 36, is connected through a wide-area network to the plurality of peripheral nodes 30 and provides diagnostic and node configuration alteration functions. In yet another alternate embodiment of the present invention, one central controller is used to replace all of the node controllers 36 so that the central controller actively controls each and every peripheral node over the wide area network.

While the embodiments of the present invention which have been disclosed herein are the preferred forms, other embodiments of the apparatuses and methods of the present invention will suggest themselves to persons skilled in the art in view of this disclosure. Therefore, it will be understood that variations and modifications can be effected within the spirit and scope of the invention and that the scope of the present invention should only be limited by the claims below.

I claim:

1. A method of providing an automated operator service to bridge a call, said method comprising the steps of:
   providing a bridging node located outside of a public switched network and connected to a carrier switch within the public switched network, wherein the bridging node includes a storage device with a plurality of stored voice prompts;
   receiving on a first communication path at the bridging node from the carrier switch a call bridging request, including, an origination number and a destination assigned to a destination telephone located remotely from the bridging node, as a result of a caller dialing the destination number to initiate a first telephone call from an origination telephone located remotely from the bridging node to which is assigned an origination number;
   comparing the origination number to a predefined origination number table to control access to the bridging node at the bridging node after receiving step;
   after the comparing step, answering the first telephone call on the first communication path at the bridging node;
   transmitting a voice prompt of the plurality of stored voice prompts from the bridging node to the origination telephone requesting selection of a billing method;
   receiving a billing method selection indication at the bridging node from the origination telephone;
   initiating a second telephone call from the bridging node through a second communication path to the destination telephone, including transmitting the destination number from the bridging node through the second communication path to the carrier switch; and
   connecting the first communication path to the second communication path at the bridging node to bridge the origination telephone to the destination telephone.

2. A method of providing an automated operator service to bridge a call, said method comprising the steps of:
   providing a bridging node located outside of a public switched network and connected to a carrier switch within the public switched network, wherein the bridging node includes a storage device with a plurality of stored voice prompts;
   receiving on a first communication path at the bridging node from the carrier switch a call bridging request, including, at least, a destination assigned to a destination telephone located remotely from the bridging node, as a result of a caller dialing the destination number to initiate a first telephone call from an origination telephone located remotely from the bridging node to which is assigned an origination number;
   answering the first telephone call on the first communication path at the bridging node;
   transmitting a voice prompt to the origination telephone from the bridging node prompting the caller for a personal identification number, receiving a response at the bridging node from the caller, and comparing the response from the caller to a list of personal identification numbers at the bridging node to control access to the bridging node;
   transmitting a voice prompt of the plurality of stored voice prompts from the bridging node to the origination telephone requesting selection of a billing method;
   receiving a billing method selection indication at the bridging node from the origination telephone;
   initiating a second telephone call from the bridging node through a second communication path to the destination telephone, including transmitting the destination number from the bridging node through the second communication path to the carrier switch; and
   connecting the first communication path to the second communication path at the bridging node to bridge the origination telephone to the destination telephone.

3. A method of providing an automated operator service to bridge a call, said method comprising the steps of:
   providing a bridging node located outside of a public switched network and connected to a carrier switch within the public switched network, wherein the bridging node includes a storage device with a plurality of stored voice prompts;
   receiving on a first communication path at the bridging node from the carrier switch a call bridging request, including, at least, a destination assigned to a destination telephone located remotely from the bridging node, as a result of a caller dialing the destination number to initiate a first telephone call from an origination telephone located remotely from the bridging node to which is assigned an origination number;

answering the first telephone call on the first communication path at the bridging node;

transmitting a voice prompt of the plurality of stored voice prompts from the bridging node to the origination telephone requesting selection of a billing method;

receiving a billing method selection indication at the bridging node from the origination telephone;

initiating a second telephone call from the bridging node through a second communication path to the destination telephone, including transmitting the destination number from the bridging node through the second communication path to the carrier switch;

connecting the first communication path to the second communication path at the bridging node to bridge the origination telephone to the destination telephone; and recording conversation between the origination telephone and the destination telephone at the bridging node after the first communication path is connected to the second communication path.

4. A method of providing an automated operator service to bridge a call, said method comprising the steps of:

providing a bridging node located outside of a public switched network and connected to a carrier switch within the public switched network, wherein the bridging node includes a storage device with a plurality of stored voice prompts;

receiving on a first communication path at the bridging node from the carrier switch a call bridging request, including, at least, a destination assigned to a destination telephone located remotely from the bridging node, as a result of a caller dialing the destination number to initiate a first telephone call from an origination telephone located remotely from the bridging node to which is assigned an origination number;

answering the first telephone call on the first communication path at the bridging node;

transmitting a voice prompt of the plurality of stored voice prompts from the bridging node to the origination telephone requesting selection of a billing method;

receiving a billing method selection indication at the bridging node from the origination telephone;

initiating a second telephone call from the bridging node through a second communication path to the destination telephone, including transmitting the destination number from the bridging node through the second communication path to the carrier switch;

connecting the first communication path to the second communication path at the bridging node to bridge the origination telephone to the destination telephone;

accepting on a third communication path at the bridging node a monitoring call from a monitor telephone; and connecting the monitor telephone to the origination telephone and the destination telephone by connecting the third communication path to the first and second communication paths at the bridging node.

5. A call bridging apparatus comprising:

an interface connected outside of a public switched network and through a carrier switch of the public switched network to an origination telephone having an origination number and a destination telephone having a destination number, said interface including, at least, a plurality of communication ports connected to the carrier switch;

an audio response means connected to said interface for storing and playing audio signals; and a control means for controlling said call bridging apparatus, said control means including, at least, a receiving means for directing said interface to accept a call through a first communication port from a caller dialing the destination number from the origination telephone, a calling means for directing said interface and said audio response means to call the destination telephone through a second communication port, a connecting means for directing said interface to connect the origination telephone to the destination telephone by connecting the first communication port to the second communication port, and a monitoring means for directing said audio response means to record conversation between the origination telephone and the destination telephone.

6. A call bridging apparatus comprising:

an interface connected outside of a public switched network and through a carrier switch of the public switched network to an origination telephone having an origination number and a destination telephone having a destination number, said interface including, at least, a plurality of communication ports connected to the carrier switch;

an audio response means connected to said interface for storing and playing audio signals; and a control means for controlling said call bridging apparatus, said control means including, at least, a receiving means for directing said interface to accept a call through a first communication port from a caller dialing the destination number from the origination telephone, a calling means for directing said interface and said audio response means to call the destination telephone through a second communication port, a connecting means for directing said interface to connect the origination telephone to the destination telephone by connecting the first communication port to the second communication port, and a monitoring means for directing said interface to accept a call from a monitoring telephone through a third communication port and connecting the monitoring telephone to the origination telephone and destination telephone.

7. A method of providing telecommunication services, said method comprising the steps of:

providing an audio response node located outside of a public switched network;

receiving on a particular input port of the audio response node an access request from a caller dialing a destination number from a origination telephone to which is assigned an origination number, wherein the access request includes the origination number and the destination number;

generating input port identification data identifying the particular input port receiving the access request;

analyzing the origination number, the destination number, and the input port identification data to select and initiate a particular telecommunication service from a variety of telecommunication services provided by the audio response node, wherein the particular telecommunication service includes calling a destination number through an output port and bridging the input port with the output port; and recording conversation flowing through the input port and output port.

* * * * *